United States Patent [19]

Fertl et al.

[11] Patent Number: 4,636,994
[45] Date of Patent: Jan. 13, 1987

[54] METHOD OF DETERMINING SHEAR WAVE TRAVEL TIME IN SUBSURFACE FORMATIONS

[75] Inventors: Walter H. Fertl; Elton Frost, both of Houston, Tex.

[73] Assignee: Dresser Industries, Inc., Dallas, Tex.

[21] Appl. No.: 534,879

[22] Filed: Sep. 22, 1983

[51] Int. Cl.⁴ .......................... G01V 1/28; G01V 1/40
[52] U.S. Cl. ...................................... 367/75; 364/422; 73/152
[58] Field of Search ....................... 367/75, 27, 25, 35; 181/105, 102; 364/422; 73/152

[56] References Cited

U.S. PATENT DOCUMENTS

| | | | |
|---|---|---|---|
| 2,784,796 | 3/1957 | Overton, Jr. | 181/0.5 |
| 3,127,950 | 4/1964 | Itria | 181/0.5 |
| 3,354,983 | 11/1967 | Erickson et al. | 181/0.5 |
| 4,105,993 | 8/1978 | Grassy et al. | 367/75 |
| 4,207,961 | 6/1980 | Kitsunezaki | 181/106 |
| 4,319,345 | 3/1982 | Dennis | 367/25 |
| 4,346,592 | 8/1982 | Fertl et al. | 73/152 |
| 4,369,497 | 1/1983 | Poupon et al. | 364/422 |
| 4,383,308 | 5/1983 | Caldwell | 367/31 |
| 4,394,754 | 7/1983 | Waters | 367/75 |

OTHER PUBLICATIONS

Poupon et al., "Log Analysis of Sand-Shale Sequences . . . " Jul. 1970, Journal of Petroleum Tech., pp. 867-881.
Pickett, "Acoustic Character Logs and Their Applications in Formation Evaluation," 6/63, Journal of Petroleum Tech., pp. 659-667.
Nations, "Lithology and Porosity from Acoustic Sheer and Compressional . . . ," 11-12/74, The Log Analyst, pp. 3-8.

Primary Examiner—Nelson Moskowitz
Assistant Examiner—Ian J. Lobo
Attorney, Agent, or Firm—Patrick H. McCollum

[57] ABSTRACT

Methods for estimating shear wave travel time in formations of mixed lithology employing the compressional wave travel time in conjunction with other logging derived information. A shear/compressional wave travel time ratio is established for a sand formation as a function of the porosity of the formation. A shear/compressional wave travel time ratio is established for a shale formation as a function of bulk shale density as derived from the bulk density of the formation. A shale factor is used to compensate the two ratios to the mixed lithology of the measured formation providing a shear/compressional wave travel time ratio for the measured formation. Shear wave travel time is determined using the formation travel time ratio and a compressional wave travel time measurement.

13 Claims, 2 Drawing Figures

METHOD OF DETERMINING SHEAR WAVE TRAVEL TIME IN SUBSURFACE FORMATIONS

BACKGROUND OF THE INVENTION

This invention relates generally to methods for investigating subsurface earth formations, and more specifically to methods for estimating the shear wave travel time in earth formations adjacent to a borehole.

It is known in acoustic well logging to utilize one or more acoustic pulse transmitters spaced axially along a borehole from one or more acoustic receivers as illustrated in U.S. Pat. Nos. 4,131,875 and 4,346,460. When an acoustic pulse is generated by a transmitter a complex acoustic wave is produced. This acoustic wave travels both radially away from the borehole into the formation and axially towards the receiver. The receivers convert the received acoustic wave into an electrical wave form for processing.

Acoustic waves are broadly classified into two groups: longitudinal waves and transverse waves. Each of these groups comprises several wave types. Most common in the field of acoustic well logging are the compressional waves and the shear waves. Compressional waves are propogated in the compressional mode, that is, the direction of propagation is parallel to the direction of particle displacement. The compressional wave propagates in the borehole fluid, is critically refracted into the surrounding formation in a compressional fashion and returns through the borehole fluids to the instrument receiver as a compressional wave. Gases, liquids and solids tend to oppose compression; therefore, compressional waves can be propagated through them.

Shear waves are propagated in the shear mode, that is, the direction of propagation is perpendicular to the direction of particle displacement. The shear wave propagates as a compressional wave in the borehole fluid, is critically refracted into the formation as a shear wave and returns to the receivers as a compressional wave through the borehole fluid. Because of their rigidity, solids tend to oppose shearing. Therefore, shear waves can be propagated through solids. On the other hand, liquids and gases have no rigidity and cannot oppose shearings, shear waves cannot be propagated through them.

Each acoustic pulse of sufficient amplitude produce an acoustic signal at each receiver. Shortly after pulse initiation, the acoustic events arrive at the receiver in the following order. First, the compressional wave; next, the shear wave; and finally a group of later waves, such as the mud wave and the boundary wave. Each wave arrives at a receiver as a wave train that comprises a large number of cycles. Because of the inertia of particles, the amplitude of successive cycles increases at first, reaches a maximum, and then decreases. The time of the first arrival, the amplitude of the cycles, and the persistence of the wave train are different for each formation wave. They are also dependent upon the type of formation and are therefore characteristic of the formation.

In common acoustic logging practice the shear wave arrives before the end of the compressional wave. This overlap produces wave interference and, therefore, distortion of some cycles of the signal. Also, the compressional wave always exists, the shear wave can typically be determined only when the shear velocity in the formation is greater than the compressional velocity in the mud. This is generally only the case in consolidated formations.

Accordingly, the present invention overcomes the deficiencies of the prior art by providing methods for estimating in unconsolidated, shaly formations and/or gas bearing formations the shear wave travel time and other, logging derived information.

SUMMARY OF THE INVENTION

Methods for estimating shear wave travel time in formations of mixed lithology, for example shale/sand sequences, employ the compressional wave travel time in conjunction with other logging derived information. A ratio of compressional wave to shear wave travel time for a sand formation $(t_s/t_c)_{sd}$ is established as a function of the porosity ($\phi$) of the formation as determined by conventional methods. A ratio of compressional wave to shear wave travel time for a shale formation $(t_s/t_c)_{sh}$ is established as a function of bulk shale density ($\rho_{sh}$) as derived from the bulk density ($\rho$) of the formation as determined by conventional methods. A shale factor ($V_{sh}$), derived in accordance with conventional methods, is used to compensate the two ratios to the mixed lithology formation providing a compressional wave to shear wave travel time ratio for the measured formation $(t_s/t_c)_f$. An estimate of the shear wave travel time ($t_s$) is determined using the formation ratio and a compressional wave travel time measurement.

DETAILED DESCRIPTION OF THE PREFERRED EMBODIMENT

Figure 1:
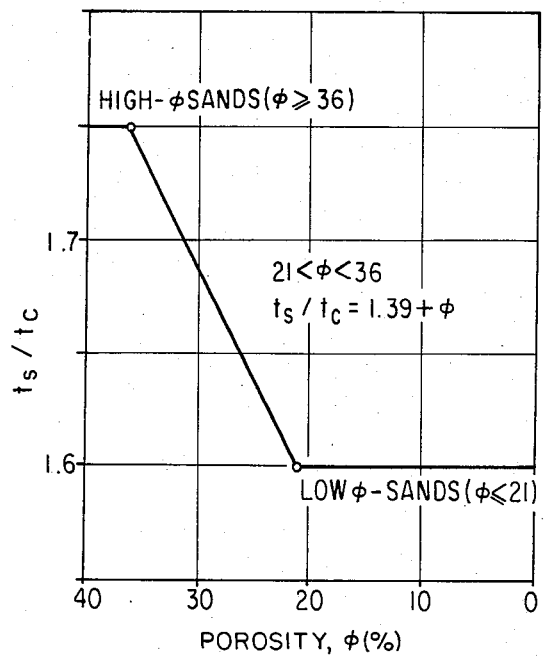
FIG. 1 is a graphic representation of the approximation of compressional wave to shear wave travel time for sand formations.

Shear waves are seismic in character and their velocity, or the inverse travel time, provides one basis of determining a number of elastic constants of the earth formations. There are certain of these elastic constants which require shear wave data for determining their values. Determination of these elastic constants is of great use in evaluation of the nature and properties of these earth formations.

Elastic constants that are valuable for evaluation of subsurface earth formations include the modules of rigidity, Young's modulus and the bulk modulus. To determine any of these modules it is important to have a value of Poisson's ratio. Poisson's ratio is a pure number that involves an expression that includes values for the compressional wave velocity, and the shear wave velocity for the formation under the consideration. One expression for Poisson's ratio is in accordance with the relationship:

$$\sigma = \frac{\frac{1}{2}\left(\frac{V_c}{V_s}\right)^2 - 1}{\left(\frac{V_c}{V_s}\right)^2 - 1} \quad (1)$$

where $V_c$ is the velocity of the compressional wave, and
$V_s$ is the velocity of the shear wave.

Since velocity is inversely related to travel time equation (1) can be rewritten as:

$$\sigma = \frac{[0.5(t_s/t_c)^2 - 1.0]}{[(t_s/t_c)^2 - 1.0]} \quad (2)$$

where
$t_s$ is the travel time for the shear wave, and
$t_c$ is the travel time for the compressional wave.

Thus, the ratio of compressional wave travel time to shear wave travel time can be expressed as:

$$t_s/t_c = \left(\frac{(1-\sigma)}{(0.5-\sigma)}\right)^{0.5} \quad (3)$$

As previously mentioned, the value of shear wave travel time ($t_s$), and thus the value of the compressional wave travel time to shear wave travel time ($t_s/t_c$), is not easily determined in shaly, unconsolidated formations. Therefore, a new approach is necessary to determine in shaly sediments the shear wave travel time from the compressional wave travel time, supplemented by other logging derived information. Thus, in shaly sediment sequences, that is formations of mixed-sand/shale lithology the $t_s/t_c$ ratio for the formation can be expressed by the relationship:

$$(t_s/t_c)_f = f((t_s/t_c)_{sd}, (t_s/t_c)_{sh}) \quad (4)$$

The $t_s/t_c$ ratio of the total formation is a function of the $t_s/t_c$ ratio in sand formations and the $t_s/t_c$ ratio in shale formations. Equation (4) can be rewritten in a material balance form as:

$$(t_s/t_c)_f = (1-V_{sh})(t_s/t_c)_{sd} + V_{sh}(t_s/t_c)_{sh} \quad (5)$$

where $V_{sh}$ represents the volume of shale in the formation and $(1-V_{sh})$ represents the volume of sand in the formation. The shaliness indicator $V_{sh}$ can be obtained from logging measurements well known in the art, such as from a natural gamma ray instrument of the type generally illustrated in U.S. Pat. No. 4,271,356 which is incorporated herein by reference.

In normally compacted shaly sediment sequences shale bulk density and porosity increase with depth of burial and the compressional wave to shear wave travel time ratio decreases in value. Relating these behavior in a linear fashion they may be expressed as:

$$(t_s/t_c)_{sd} = f(\phi)$$

where $\phi$ is the formation porosity as provided from conventional logging data such as well known methods of acoustic logging, and $$(t_s/t_c)_{sh} = f(\rho_{sh})$$

$\rho_{sh}$ is the bulk density of the shales as provided from conventional logging data such as well known methods of density logging as illustrated in U.S. Pat. No. 3,321,625, which is incorporated herein by reference.

Studies detailed in "Acoustic Character Logs and Their Applications in Formation Evaluation", authored by G. R. Pickett and published in the Journal of Petroleum Technology, (6): pp 659-667 in 1963, which is herein incorporated by reference, have investigated the relationship of compressional wave and shear wave travel times as a function of formation lithology. The ratio $t_s/t_c$ in clean sandstones was observed to vary from 1.60 in low-porosity sands, $\phi \leq 21\%$, to 1.75 in high-porosity sands, $\phi \geq 36\%$. Employing a linear approximation yields the relationship:

$$(t_s/t_c)_{sd} = 1.39 + \phi \quad (8)$$

for clean sand formations. The approximation of $t_s/t_c$ for clean sands with varying porosity is illustrated in FIG. 1 where porosity is plotted on the abscissa and the $(t_s/t_c)_{sd}$ ratio is plotted on the ordinate.

Figure 2:
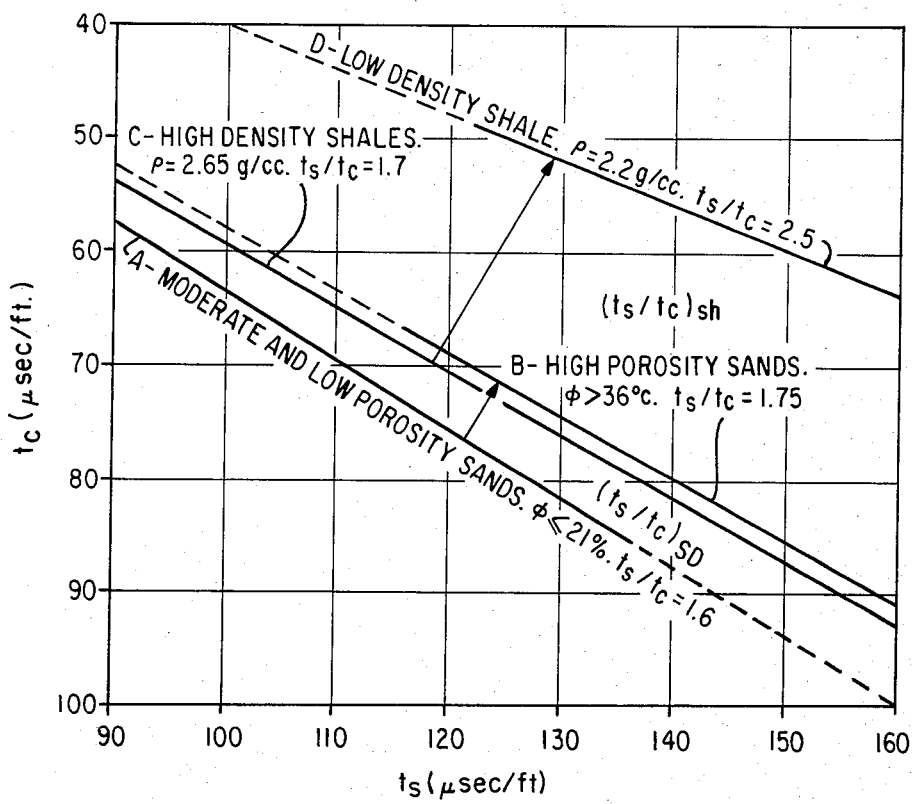
FIG. 2 is a graph representing the relation of compressional travel time to shear wave travel time for sand and shale formations.

The relationship is likewise illustrated in FIG. 2 where line A illustrates the $(t_s/t_c)_{sd}$ ratio of 1.60 for sands having a porosity less than 21%, line B illustrates the $(t_s/t_c)_{sd}$ ratio of 1.75 for sands having a ratio of greater than 36% and the area between line A and line B is a function of the measured porosity.

As previously stated, shale bulk density increases with increasing depth of burial and the compressional wave to shear wave travel time ratio will decrease in value. Relating these in a linear fashion equation (7) can be expanded as:

$$(t_s/t_c)_{sh} = \frac{R_{max} - (R_{max} - R_{min})(\rho SH - \rho SH_{min})}{(\rho SH_{max} - \rho SH_{min})} \quad (9)$$

where $\rho SH$ is the wet bulk shale density, which can be derived from a bulk density log of the formation, $R_{max}$ is the maximum value of $t_s/t_c$ ratio in low density shales, $R_{min}$ is the minimum value of $t_s/t_c$ ratio in high density shales, $\rho SH_{min}$ is the value of the bulk density of shales at $R_{max}$, $\rho SH_{max}$ is the value of the bulk density of shales at $R_{min}$, and $R_{min} \leq (t_s/t_c)_{sh} \leq R_{max}$.

Data indicates that the ratio $t_s/t_c$ in pure shale formations varies from approximately 1.70 is high-density shales, $\rho = 2.65$ g/cc, to approximately 2.50 in low-density shales, $\rho = 2.2$ g/cc. Employing a linear approximation yields the relationship:

$$(t_s/t_c)_{sh} = 6.416 - 1.78(\rho SH) \quad (10)$$

The relationship is illustrated in FIG. 2 where line C illustrates the $(t_s/t_c)_{sh}$ ratio of 1.70 for shales having an average density of 2.65 g/cc and line D illustrates the $(t_s/t_c)_{sh}$ ratio of 2.50 for shales having an average density of 2.2 g/cc.

As previously illustrated by equation (4) the $t_s/t_c$ ratio for a mixed lithology formation is a function of the $t_s/t_c$ ratio for sand formations and the $t_s/t_c$ ratio for shale formations. Since $(t_s/t_c)_{sd}$ is a function of porosity, as provided from porosity logging data, and $(t_s/t_c)_{sh}$ is a function of shale bulk density, as provided from bulk density logging data, and $V_{sh}$ is a shaliness indicator for the formation, as provided from gamma radiation logging data, the $(t_s/t_c)_f$ can be estimated for the actual formation. Then, by having defined the $t_s/t_c$ ratios for both sand and shale and the shaliness component to obtain the $t_s/t_c$ ratio for the formation the shear wave travel time for the formation can be estimated as:

$$t_s = (t_s/t_c)_f t_c \quad (11)$$

where $t_c$ is the measured travel time for the compressional wave as provided from standard acoustic logging methods.

In alternate embodiments of the invention, rather than utilizing a bulk density measurement to obtain bulk shale density ($\rho$SH) for use in determining the $(t_s/t_c)_{sh}$ value, either neutron porosity, as provided by a neutron log common in the art as illustrated in U.S. Pat. Nos. 3,483,376 and 3,521,062 which are incorporated herein by reference, or macroscopic thermal neutron cross-section ($\Sigma$), as provided by a pulsed neutron log as illustrated in U.S. Pat. No. 3,558,888 which is incorporated herein by reference, may be used. Since neutron porosity and thermal neutron cross-section values decrease with depth of burial equation (9) is rewritten as:

$$(t_s/t_c)_{sh} = \frac{R_{max} - (R_{max} - R_{min})(0\ N_{sh} - 0\ N_{max})}{(0\ N_{min} - 0\ N_{max})} \quad (12)$$

for neutron porosity where $\phi/N_{sh}$ is the neutron porosity of the shale formations, $\phi N_{min}$ is the neutron response in shales at $R_{min}$, $\phi_{max}$ is the neutron response in shales at $R_{max}$, and $R_{min} \leq t_s/t_c \leq R_{max}$ and $$(t_s/t_c)_{sh} = \frac{R_{max} - (R_{max} - R_{min})(\Sigma_{sh} - \Sigma_{max})}{(\Sigma_{min} - \Sigma_{max})} \quad (13)$$

for pulsed neutron logging where $\Sigma_{sh}$ is macroscopic thermal neutron cross-section of the shale formations, $\Sigma_{min}$ is the neutron response in shales at $R_{min}$, $\Sigma_{max}$ is the neutron response in shales at $R_{max}$, and $R_{min} \leq t_s/t_c \leq R_{max}$. The sand $t_s/t_c$ ratio and the shale $t_s/t_c$ ratio can then be used to derive the $t_s/t_c$ ratio for the formation.

Thus there has been described and illustrated herein methods in accordance with the present invention wherein new and improved methods are described which provide determinations of the shear wave travel time of subsurface formations. However, while particular embodiments of the present invention have been illustrated and described, it will be apparent to those skilled in the art that changes and modifications may be made without departing from the invention in broader aspects.

The embodiments of the invention in which an exclusive property or privilege is claimed are defined as follows:

1. A method for determining an acoustic shear wave travel time for mixed lithology formations, comprising the steps of:
   determining a shear/compressional travel time ratio for sand formations in response to a first characteristic of the mixed lithology formations, said first characteristic being porosity;
   determining a shear/compressional travel time ratio for shale formations in response to a second characteristic of said mixed lithology formations;
   determining a shear/compressional travel time ratio for mixed lithology formations in response to said shear/compressional travel time ratio for sand formations and said shear/compressional travel time ratio for shale formations; and
   determining said acoustic shear wave travel time for mixed lithology formations in response to said shear/compressional travel time ratio for said mixed lithology formations and a third characteristic of said mixed lithology formations; said third characteristic being compressional wave travel time for said mixed lithology formations.

2. The method for determining an acoustic shear wave travel time according to claim 1 wherein said step of determining a shear/compressional travel time ratio for said mixed lithology formations further comprises the step of compensating said shear/compressional travel time ratio for sand formations and said shear/compressional travel time ratio for shale formations in response to a fourth characteristic of said formations, said fourth characteristic being the shale factor of said mixed lithology formations.

3. The method for determining an acoustic shear wave travel time according to claim 1 wherein said shear/compressional travel time ratio for shale formations is determined in response to the bulk density of said mixed lithology formations.

4. The method for determining an acoustic shear wave travel time according to claim 1 wherein said shear/compressional travel time ratio for shale formations is determined in response to the neutron porosity of said mixed lithology formation.

5. The method for determining an acoustic shear wave travel time according to claim 1 wherein said shear/compressional travel time ratio for shale formations is determined in response to the macroscopic thermal neutron capture cross-section of said mixed lithology formations.

6. A method for determining an acoustic shear wave travel time for earth formations, comprising the steps of:
   determining a shear/compressional travel time ratio for sand formations in response to the earth formation porosity;
   determining a shear/compressional travel time ratio for shale formations in response to a characteristic of said earth formation;
   determining the shale volume of said earth formation;
   determining a shear/compressional travel time ratio for said earth formation in response to said earth formation shale volume and said shear/compressional travel time ratios for sand and shale formations; and
   determining the shear wave travel time for said earth formation in response to said shear/compressional travel time ratio for said earth formation and the compressional wave travel time for said earth formation.

7. The method for determining the shear wave travel time according to claim 6 wherein said shear/compressional travel time ratio for shale formations is determined in response to the bulk density of said formation.

8. The method for determining the shear wave travel time according to claim 6 wherein said shear/compressional travel time ratio for shale formations is determined in response to the neutron porosity of said formation.

9. The method for determining the shear wave travel time according to claim 6 wherein said shear/compressional travel time ratio for shale formations is determined in response to the thermal neutron capture cross-section of said formation.

10. A method for determining an acoustic shear wave travel time for earth formations having mixed lithologies, comprising the steps of:
   measuring the porosity of the earth formations having mixed lithologies;

measuring the volume of shale of said earth formations having mixed lithologies;

measuring the acoustic compressional wave travel time of said earth formations having mixed lithologies;

measuring a radioactive characteristic of said earth formations having mixed lithologies;

determining a first shear/compressional travel time ratio in response to said porosity measurement;

determining a second shear/compressional travel time ratio in response to said radioactive characteristic measurement;

determining a third shear/compressional travel time ratio as a function of said first and second shear/compressional travel time ratios and said shale volume measurement; and determining the shear wave travel time for said earth formations having mixed lithologies in response to said third shear/compressional travel time ratio and said compressional wave travel time measurement.

11. The method for determining an acoustic shear wave travel time according to claim 10 wherein said radioactive characteristic of said earth formations having mixed lithologies comprises the bulk density of said earth formations having mixed lithologies.

12. The method for determining an acoustic shear wave travel time according to claim 10 wherein said radioactive characteristic of said earth formations having mixed lithologies comprises the neutron porosity of said earth formations having mixed lithologies.

13. The application of claim 10 wherein said radioactive characteristic of said earth formations having mixed lithologies comprises the macroscopic thermal neutron cross-section of said earth formations having mixed lithologies.

* * * * *